United States Patent [19]

Kashida et al.

[11] Patent Number: 5,124,853
[45] Date of Patent: Jun. 23, 1992

[54] INFORMATION SIGNAL RECORDING APPARATUS RECORDING PILOT SIGNALS FOR TRACKING CONTROL

[75] Inventors: Motokazu Kashida, Tokyo; Makoto Shimokoriyama; Shinichi Yamashita, both of Kanagawa; Susumu Kozuki, Tokyo; Koji Takahashi, Kanagawa, all of Japan

[73] Assignee: Canon Kabushiki Kaisha, Tokyo, Japan

[21] Appl. No.: 600,143

[22] Filed: Oct. 17, 1990

Related U.S. Application Data

[63] Continuation of Ser. No. 13,389, Feb. 11, 1987, abandoned.

[30] Foreign Application Priority Data

| Feb. 18, 1986 [JP] | Japan | 61-034731 |
| Feb. 27, 1986 [JP] | Japan | 61-042507 |
| Feb. 27, 1986 [JP] | Japan | 61-042508 |
| Feb. 27, 1986 [JP] | Japan | 61-042509 |

[51] Int. Cl.⁵ .................. G11B 5/584; G11B 15/14
[52] U.S. Cl. .................. 360/77.140; 360/18; 360/64; 360/77.01
[58] Field of Search .................. 360/18–23, 360/27, 32, 61, 64, 75, 76, 73.04–73.14, 77.01, 77.02, 77.05, 77.07–77.15

[56] References Cited

U.S. PATENT DOCUMENTS

| 3,263,031 | 7/1966 | Welsh | 360/77.11 |
| 4,597,023 | 6/1986 | Rijckaert | 360/77 |
| 4,665,447 | 5/1987 | Odaka | 360/77 |

FOREIGN PATENT DOCUMENTS

| 0170223 | 2/1986 | European Pat. Off. | 360/77 |

Primary Examiner—Aristotelis Psitos
Assistant Examiner—Steven R. Garland
Attorney, Agent, or Firm—Robin, Blecker, Daley & Driscoll

[57] ABSTRACT

In an information signal recording apparatus having an m (m≧2) number of heads arranged to record, in many parallel tracks on a recording medium, information signals of the m number of channels by simultaneously tracing the surface of the medium while simultaneously forming thereby the m number of tracks, pilot signals of an n number of kinds are recorded in rotation along with the information signals of the m number of channels in such a way as to recur in a cycle of an (n×m) number of tracks.

15 Claims, 12 Drawing Sheets

- a: GUARD SPACE 1
- b: CLOCK-RUN-IN 1
- c: AUDIO DATA
- d: GUARD SPACE 2
- e: CLOCK-RUN-IN 2
- f: VIDEO DATA
- g: GUARD SPACE 3

X1 PILOT SIGNAL ex PILOT SIGNAL + CLOCK-RUN-IN 2

X2 PILOT SIGNAL

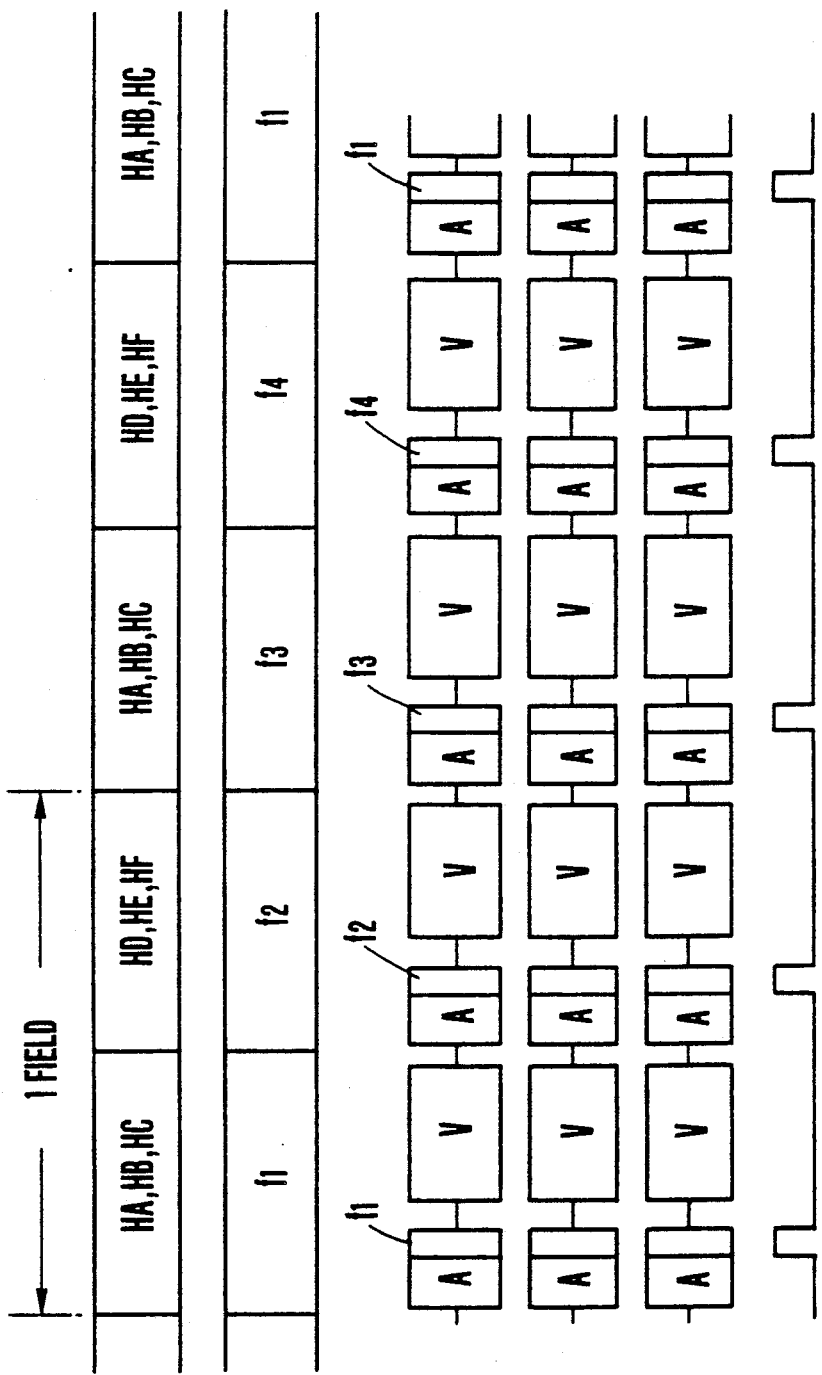

INFORMATION SIGNAL RECORDING APPARATUS RECORDING PILOT SIGNALS FOR TRACKING CONTROL

This application is a continuation of application Ser. No. 013,389 filed Feb. 11, 1987 now abandoned.

BACKGROUND OF THE INVENTION

1. Field of the Invention

This invention relates to an information signal recording apparatus and more particularly to an apparatus arranged to record pilot signals along with the information signal for tracking control.

2. Description of the Related Art

In the field of the apparatuses of the kind using rotary heads for recording and/or reproducing signals by tracing a magnetic tape, research and development work has come to be actively conducted during recent years for digital tape recorders which record and reproduce digital data instead of analog signals. In recording and reproducing a video signal such as a standard television signal in real time with such a digital tape recorder, the amount of coded data becomes very large. The large amount necessitates high density magnetic recording. In addition, high speed data recording is necessary as the amount of data to be recorded or reproduced per unit time is also very large.

The so-called multi-track recording arrangement in which a plurality of recording tracks are simultaneously formed is considered to be a method for meeting these requirements. Further, to lessen the track pitch as much as possible in carrying out multi-track recording with a rotary head, there has been contrived a so-called azimuth overlap writing method in which adjacent recording tracks are arranged to have different magnetizing directions with no guard band provided between them.

Generally, it is important for a rotary head type magnetic recording and/or reproducing apparatus to perform tracking control over the head during a reproducing operation to have the head accurately trace the recording tracks. The tracking control methods employed by the conventional rotary head type magnetic recording and/or reproducing apparatus include a method in which control signals (hereinafter referred to as the CTL signal) for tracking control are longitudinally recorded along the edge of a magnetic tape and another method called the four frequency method in which pilot signals of four different kinds are superimposed on information signals.

However, the method of using the CTL signal is not suited for high density magnetic recording because it necessitates the provision of an additional track specially allocated for the control signal. Besides, tracking control cannot be accurately accomplished by this method because of a mismatch which tends to arise between the actual recording track and the CTL signal.

As regards the four frequency method and particularly in the event of multi-track recording, a plurality of different kinds among four different kinds of the pilot signals must be selectively generated. Besides, a signal processing operation for obtaining a tracking error signal becomes complex accordingly. Therefore, the four frequency method results in an excessively large hardware arrangement. Further, even if the tracking error signal obtaining hardware is thus arranged, a plurality of tracking error signals would simultaneously be generated. Then, the simultaneously generated tracking error signals must be adequately processed. The four frequency tracking control method is therefore not suitable for multi-track recording. Further, in the event of frequency multiplexing the pilot signals along with digital video signals, it affects the modulated waves of the digital video signals. Hence, this brings about an increased rate of error during recording or reproduction. It is conceivable to solve this problem by multiplexing the tracking control pilot signals in a time-sharing manner along with the digital video signals. However, this arrangement is also not desirable as it decreases a video signal recordable area.

SUMMARY OF THE INVENTION

It is a general object of this invention to provide an information signal recording and/or reproducing apparatus which is capable of solving the above stated problems.

It is a more specific object of this invention to provide an information signal recording apparatus of the kind performing multi-track recording which is capable of adequately performing tracking control with a relatively simple circuit arrangement.

It is another object of this invention to provide an information signal recording apparatus of the kind performing multi-track recording which is capable of recording pilot signals of a plurality of kinds along with information signals with a simple circuit arrangement.

Under this object, an information signal recording apparatus arranged as an embodiment thereof comprises (a) head means including an m number (at least two) of heads arranged to simultaneously trace the surface of a recording medium while forming many tracks in parallel on the recording medium; (b) first supply means for supplying the head means simultaneously with information signals of the m number of channels, the first supply means being arranged to have the information signals of the m number of channels recorded in the many tracks in a cycle of the m number of tracks; and (c) second supply means for supplying the head means with pilot signals of an m number of kinds, the second supply means being arranged to have the pilot signals of the n number of kinds recorded in the many tracks in a cycle of an (m × n) number of tracks.

It is a further object of this invention to provide an information signal recording apparatus for recording information signals in the form of digital signals which is capable of recording pilot signals for tracking control without affecting recorded information and without lowering information signal recording density.

Under that object, a digital information signal recording apparatus arranged as another embodiment of this invention comprises (a) means for multiplexing, in a time-sharing manner, a clock signals along with a digital information signal in synchronism with the information signal; (b) means for frequency multiplexing tracking control pilot signals solely with the clock signal time-shared and multiplexed with the digital signal; and (c) recording means for recording the frequency multiplexed signals on a recording medium.

The above and other objects and features of this invention will become apparent from the following detailed description of the embodiments thereof taken in connection with the accompanying drawings.

BRIEF DESCRIPTION OF THE DRAWINGS

FIGS. 5(a) to 5(f) show in a timing chart the operating states of the various parts of the digital VTR of FIG. 3 taking place during recording.

DETAILED DESCRIPTION OF PREFERRED EMBODIMENTS

In the embodiment described below this invention is applied to a so-called digital VTR of the kind arranged to be capable of recording in an extremely high degree of density. In other words, the VTR is arranged, for example, to record on a magnetic tape a high quality TV signal having 1125 horizontal scanning lines in 1/60 sec for each field.

Figure 1:
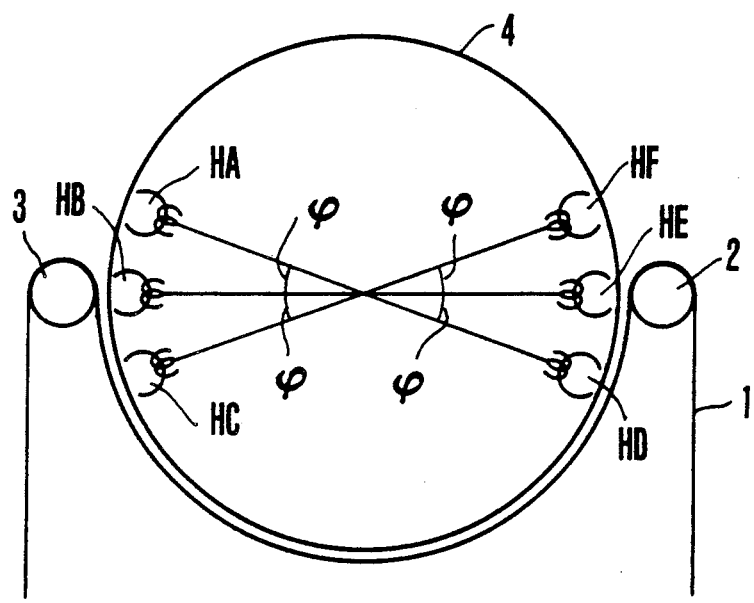
FIG. 1 is a schematic illustration of a magnetic recording/reproducing part of a digital video tape recorder (VTR) arranged as an embodiment of this invention.
Figure 2:
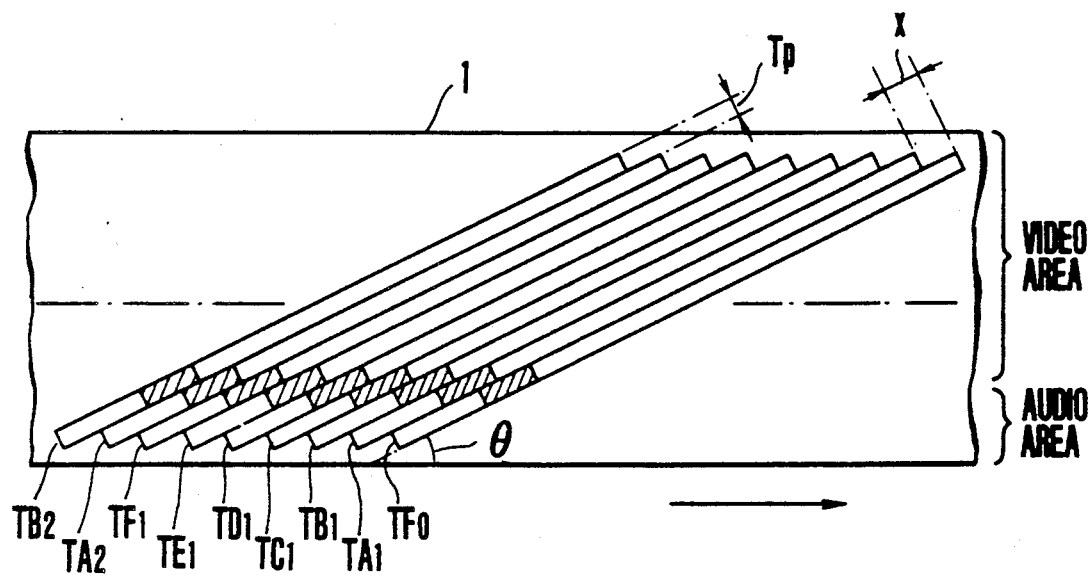
FIG. 2 is a schematic illustration of a recording pattern formed on a magnetic recording tape by the arrangement shown in FIG. 1.

FIG. 1 shows the arrangement of the magnetic recording/reproducing part of the digital VTR according to this invention. FIG. 2 shows a recording pattern formed by the arrangement of FIG. 1 on a magnetic tape. Referring to FIG. 1, the illustration includes the magnetic tape 1. Tape guide members 2 and 3 are arranged to pull out the magnetic tape from a tape cassette which is not shown and to wrap the tape at least an angle range of 180 degrees round a rotary drum 4 which is provided with rotary magnetic heads HA, HB, HC, HD, HE and HF.

As shown in FIG. 1, the heads HA, HB, HC, HD, HE and HF are arranged to revolve with a phase difference of 180°. Each of the pairs of the heads HA and HD, the heads HB and HE and the heads HC and HF are arranged to revolve on the same plane of revolution. A revolving phase difference between the heads HA and HB and between the heads HB and HC is assumed to be $\phi$ and the difference in height between their plane of revolution to be d.

The heads HA to HF respectively form recording tracks TA to TF as shown in FIG. 2. To have all these tracks formed at an even track pitch, these differences $\phi$ and d must be as follows: Assuming that the tape speed for recording is expressed as v and that each field portion of the high quality TV signal is recorded in six tracks TA to TF, the drum is allowed to make 60 revolutions per sec. Then, the length of tape necessary for forming one track is v/360. Further, assuming that the tracks are slanting at an angle of $\theta$, the track pitch Tp becomes $(v \cdot \sin \theta)/360$. Then, a deviation x between adjacent tracks in the longitudinal direction of the tracks becomes $(v \cdot \cos \theta)/360$.

Figure 3:
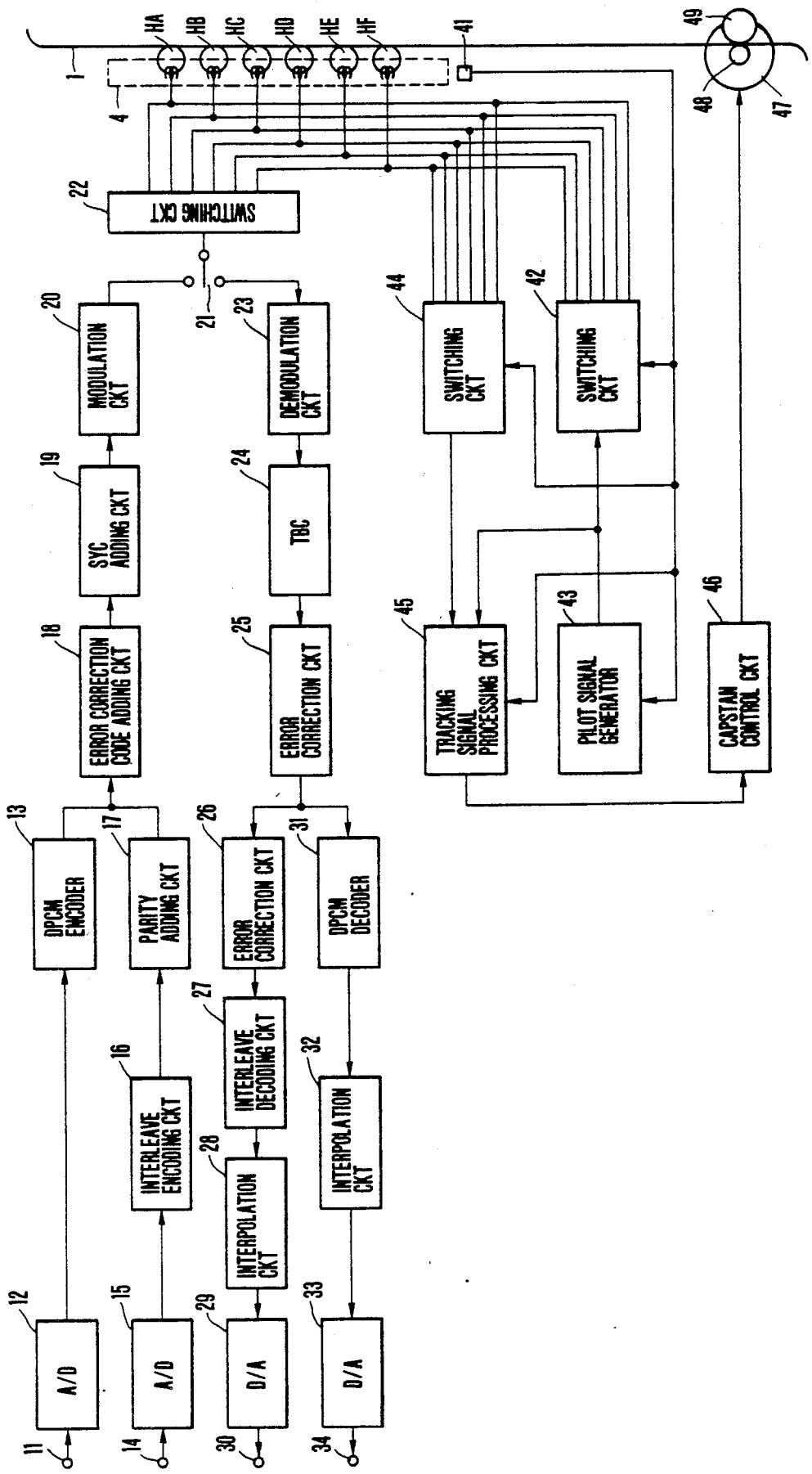
FIG. 3 is a block diagram showing in outline the arrangement of the whole digital VTR arranged as the embodiment of this invention.

In simultaneously forming the tracks TA, TB and TC, the phase difference $\phi$ among the heads HA, HB and HC becomes about $\phi \delta (v \cos \theta)/360r$ (rad) with the radius of the drum 4 assumed to be r. Then, the difference d in height among the planes of revolution of the heads HA, HB and HC can be expressed as $d = Tp(1 - 3\phi/\pi)$. However, if this makes a space required between these heads HA, HB and HC for mounting them on the drum 4 excessively narrow for mounting work, the value of the difference may be increased with the recording timing of each head shifted accordingly. Then, as apparent from the foregoing description, the difference d becomes smaller. The value of d becomes zero under condition of $\phi = \pi/3$. The following description is given on the assumption of $\phi \cong (v \cos \theta)/360$:

FIG. 3 shows in outline the arrangement of the whole digital VTR embodying this invention. In FIG. 3, the same components as those shown in FIGS. 1 and 2 are indicated by the same reference numerals. The embodiment is arranged to form the track pattern as shown in FIG. 2. One field portions of a video signal and an audio signal are divided and recorded in six tracks. Each track has the audio signal recorded within the first half thereof and the video signal in the latter half with a guard space provided in between the audio and video signals.

In FIG. 3, a terminal 11 is arranged to receive an analog video signal. The analog video signal may be a composite TV signal or some other signal like the signal called a TCI signal consisting of time-shared and multiplexed luminance and color difference signals. An analog-to-digital (hereinafter called A/D) converter 12 is arranged to sample the incoming video signal by a sub-sampling method such as sub-Nyquist sampling or the like. The data thus obtained is differential encoded by a DPCM encoder 13. Through these processes, the amount of data is compressed to about ¼ of the original amount.

An analog audio signal which is received at a terminal 14 is A/D converted by an A/D converter 15. Then, for example, the sequence of nonlinearly quantized audio data is suitably rearranged by a cross-interleave encoding circuit 16. After that, an error detecting parity word is added at a parity adding circuit 17.

Then, 1/6 field portions of these audio and video data thus obtained are alternately supplied to an error correction code adding circuit 18 to have error correction code added thereto. Following this, synchronizing data are further added to recording data at a synchronizing data adding circuit 19. With the synchronizing data added, the recording data is digitally modulated at a modulation circuit 20 by the scramble NRZ method or the like. The modulated data is supplied via a switch 21 to a switching circuit 22. The switching circuit 22 then simultaneously produces digital signals of three channels and suitably allocates them to the heads HA to HF. These signals are then recorded on a tape 1.

Figure 4A:
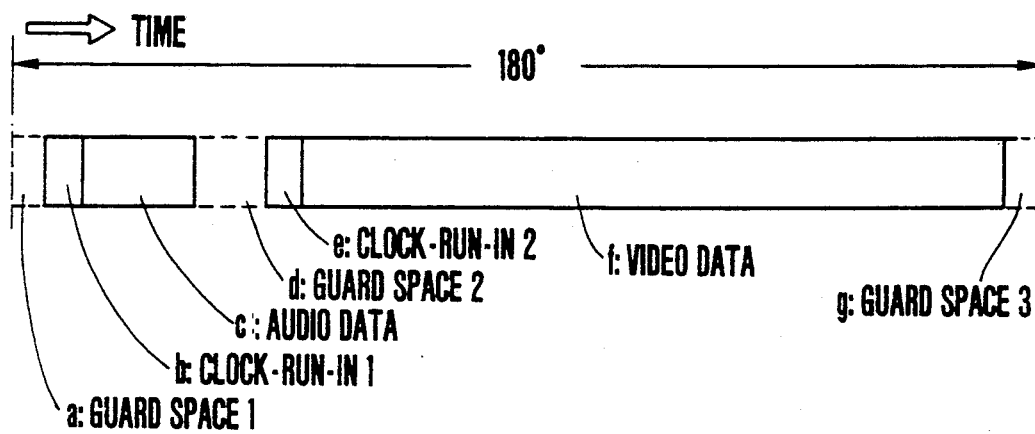
FIGS. 4(a) to 4(d) show the recording position of pilot signals in relation to information signals to be recorded.

These signals are then recorded in each track in a pattern as shown, for example, in FIG. 4(a). During reproduction, signals reproduced by the heads HA to HF are supplied via the switching circuit 22 and the switch 21 to a demodulation circuit 23 to be digitally demodulated. Following that, time base fluctuations are removed by a time base corrector 24 (hereinafter referred to as TBC). The reproduced data thus processed by the TBC 24 is supplied to an error correction circuit 25 to have its error corrected there. The error corrected video data is sampled by a DPCM decoder 31. Then, data of picture elements (sampling points) not sampled is obtained through interpolation carried out by an interpolation circuit 32 either within a frame or between frames. The reproduced data is then converted by a D/A (digital-to-analog) converter 33 into an analog video signal to be produced from a terminal 34.

Meanwhile, the error corrected audio data is provided with data of picture elements (sampling points) having no error through an interpolation process carried out by an interpolation circuit 32 either within a frame or between frames. The reproduced data is then converted by the D/A converter 33 to be produced from the terminal 34. The error of the error corrected audio data is further corrected at an error correction circuit 26. After that, the audio data is rearranged back to the original data arrangement by an interleave decoding circuit 27. The audio data is then subjected to an interpolation process at an interpolation circuit 28 which performs pre-interpolation or mean value interpolation. The audio signal which is thus restored to its original state is converted into an analog signal by a D/A converter 29 before it is produced from a terminal 30.

The digital VTR of this embodiment is arranged to perform tracking control as follows: The VTR records pilot signals of four different kinds in the so-called four frequency method with one of four kinds recorded in every three tracks in rotation. The recording position of the pilot signals are as shown by way of example in FIGS. 4(b), 4(c) and 4(d). Each head is arranged to trace the tape from the left to the right as viewed on these drawings. With the tape thus traced, recording is performed on the tape in the order of parts a, b, c, d, e, f and g in the case of FIG. 4(a). Referring to FIG. 4(a), the parts a, d and g represent guard spaces; the part b a clock-run-in for the audio data; the part c the audio data; the part e a clock-run-in for video data; and the part f the video data. The pilot signals are arranged to be multiplexed with them.

Figure 4B:
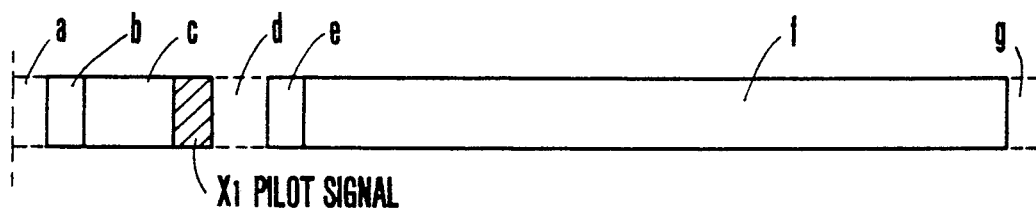
Figure 4C:
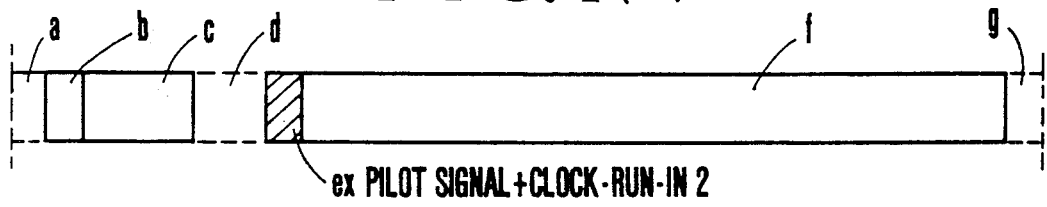
Figure 4D:
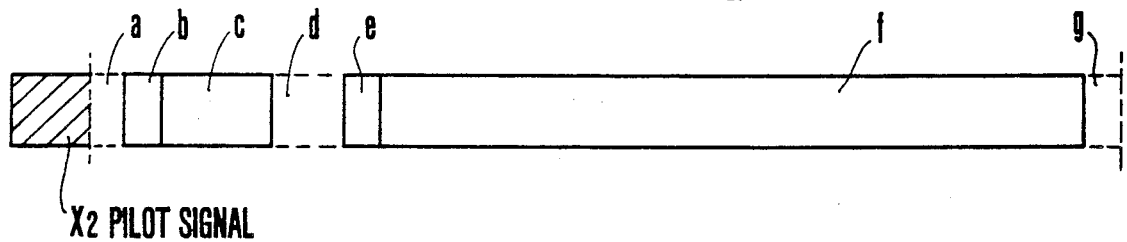

FIG. 4(b) shows a case in which the pilot signal is recorded in a space X1 immediately after the audio data c. FIG. 4(c) shows a case where the pilot signal which is at a relatively low frequency is arranged to be recorded by superimposing it on the clock-run-in e. A reference symbol ex denotes the clock-run-in which has the pilot signal superimposed thereon. It is of course possible to have the pilot signal superimposed on the clock-run-in b instead of on the clock-run-in e. FIG. 4(d) shows another case where the tape 1 is wrapped 180 degrees plus α round the drum 4 and then the pilot signal is recorded in a space x2 within the wrapping portion α.

The length of the area in which the pilot signal is to be recorded is as follows: In the case of the recording pattern as shown in FIG. 2, the length must be several times as much as the length of the deviation x in the longitudinal direction of track between adjacent tracks. The following description is on the assumption that the pilot signal is to be recorded in the track pattern as represented by FIG. 4(b):

Again referring to FIG. 3, a rotation phase detector 41 is arranged to detect the rotation phase of the drum 4 and to produce a rectangular wave signal of 60 Hz (hereinafter referred to 60 PG signal) in synchronism with the rotation of the rotary drum 4. A pilot signal generator 43 is arranged to generate at intervals of 1/60 sec according to the 60 PG signal the pilot signals f1, f2, f3 and f4 of the four different kinds, i.e. of four difference frequencies f1, f2, f3 and f4, producing in rotation in the sequence of f1-f2-f3-f4. A switching circuit 42 is arranged to supply the pilot signals f1, f2, f3 and f4 to each head in accordance with predetermined timing.

FIGS. 5(a) to 5(f) schematically show in a chart the recording timing of the VTR of this embodiment. FIG. 5(a) shows the pilot signal recording timing of the recording heads; FIG. 5(b) the pilot signal generating timing of the circuit 43; and FIGS. 5(c), 5(d) and 5(e) the signals recorded by the heads HA, HD and HB or HE, HC and HF respectively. In FIGS. 5(c), 5(d) and 5(e), reference symbols V and A respectively denote video signal and audio signal recording timing. FIG. 5(f) shows the common timing at which pilot signals are supplied to these heads respectively.

Another switching circuit 44 of FIG. 3 is arranged to timely supply a tracking signal processing circuit 45 with pilot signals reproduced from the tape 1 by the heads. The tracking signal processing circuit 45 is arranged to produce a tracking error signal (hereinafter referred to as ATF signal) by using the reproduced pilot signals. The ATF signal is supplied to a capstan control circuit 46. The circuit 46 then controls the rotation phase of a capstan 48 according to the ATF signal. The capstan 48 is arranged in combination with a fly wheel 47 and a pinch roller 49.

Figure 6:
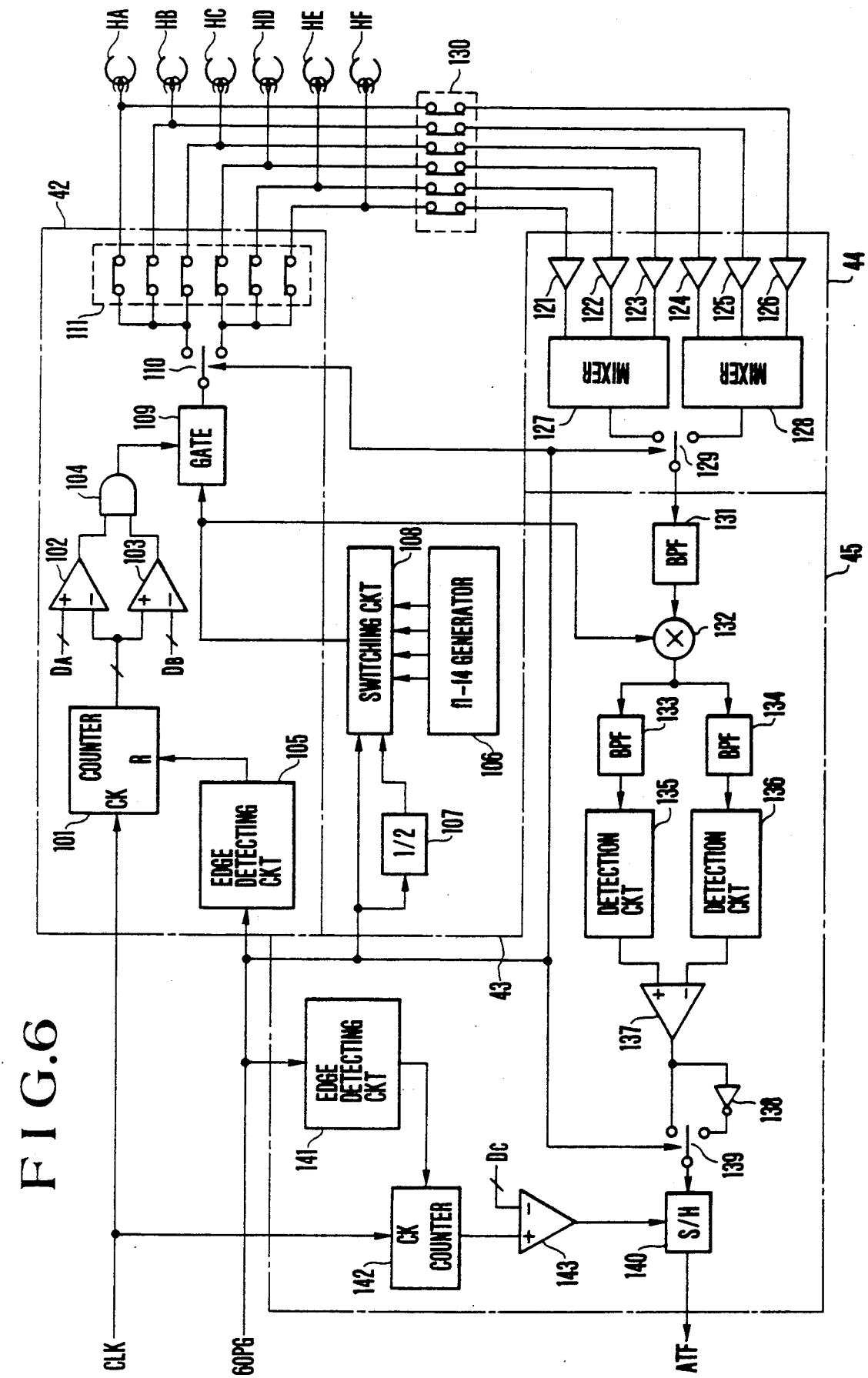
FIG. 6 is a diagram showing by way of example the arrangement of a tracking control system shown in FIG. 3.

FIG. 6 shows by way of example the details of the tracking control system shown in FIG. 3. In FIG. 6, the components corresponding to those shown in FIG. 3 are indicated by the same reference numerals and symbols.

Referring to FIG. 6, a pilot signal generator 106 is arranged to generate the pilot signals f1, f2, f3 and f4 in parallel. The pilot signals f1, f2, f3 and f4 are respectively supplied to a switching circuit 108. The switching circuit 108 is arranged to produce the pilot signals in rotation at intervals of 1/60 sec in the sequence of f1-f2-f3-f4 according to four logic levels obtained from the 60 PG signal and a rectangular wave signal of 30 Hz which is obtained by ½ frequency dividing the 60 PG signal by means of a frequency divider 107. The frequencies of the four different pilot signals are arranged, as well known, to be in the following relation: $f2 - f1 = f4 - f3 = fA$. $f4 - f1 = f3 - f2 = fB$.

A counter 101 is arranged to count clock pulses (CLK) which are sufficiently higher than 60 Hz and to be reset by an edge of the 60 PG signal detected by an edge detecting circuit 105. When the output data of the counter 101 is between data DA and data DB, Comparators 102 and 103 both produce high level outputs to make the output level of an AND gate 104 high. The high level output of the AND gate 104 opens a gate 109. The data DA and DB are set to cause the opening timing of the gate 109 to be the gate timing which is as shown in FIG. 5(f). In this instance, the pilot signal gating period is arranged to allow the pilot signal to be recorded over a length about five times as much as the above stated amount of deviation X between adjacent tracks in the longitudinal direction of tracks.

The gated pilot signals are supplied to the heads HA to HF via a switch 110 the connecting position of which is arranged to be changed from one position over to another at every 1/60 sec by the 60 PG signal and via another switch 111 which turns on for recording. The pilot signals are thus arranged to be recorded in a time-shared manner along with the audio signal A and the video signal V as shown in FIGS. 5(c), 5(d) and 5(e).

The switching circuit 44 and the tracking signal processing circuit 45 are arranged as follows: The signals reproduced by the heads HA to HF are supplied to mixers 127 and 128 via a switch 130 which turns on at the time of reproduction and amplifiers 121 to 126 respectively.

The mixer 127 mixes the outputs of the heads HA, HB and HC. The other mixer 128 mixes the outputs of the heads HD, HE and HF. In the case of this embodiment, the pilot signal of one of the different kinds is recorded in every three tracks. Therefore, with three tracks assumed to be one unit, a tracking error is detectable by comparing, through the outputs of the mixers 127 and 128, the pilot signal component recorded in the unit of three tracks which are presently under control with pilot signal components recorded in adjacent three-track units located on both sides of the track unit under control.

A switch 129 is arranged to alternately produce the outputs of the mixers 127 and 128 at every 1/60 sec. The output of the switch 129 is supplied to a band-pass filter (BPF) 131. The BPF 131 separates the pilot signals f1, f2, f3 and f4 and supplies them to a multiplier 132. Meanwhile, the multiplier 132 is receiving via a switching circuit 108 reference signals of frequencies f1, f2, f3 and f4 in rotation in the same sequence in which the pilot signals are recorded. While the reference signals f1, f2, f3 and f4 are thus supplied, the tracks to be controlled are the three tracks in which one of the pilot signals f1, f2, f3 and f4 is recorded.

BPFs 133 and 134 are arranged to extract frequency difference components fA and fB between the pilot signal recorded in the three controlled tracks and each of other pilot signals recorded in the adjacent tracks located on both sides of the controlled tracks. The outputs of these BPFs 133 and 134 are detected by detection circuits 135 and 136 respectively and are supplied to a comparator 137. The direction in which the component fA is obtained on the tape 1 and the direction in which the other component fB is obtained conversely change every time the unit of three controlled tracks change from one unit over to another. Therefore, the output of the comparator 137 produced directly and its output which is produced via an inverting amplifier 138 are alternately produced from a switch 139 for every field.

A sample-and-hold (S/H) circuit 140 is arranged to sample and hold the output signal of the switch 139. The output of the S/H circuit 140 is supplied as an ATF signal to the above stated capstan control circuit 46 for tracking control by the circuit 46. The timing for this sample-and-holding (S/H) action is arranged to coincide with timing at which the pilot signals recorded in the three-track units neighboring the controlled tracks on both sides thereof are reproduced. More specifically, the timing of the S/H action is defined by an edge detecting circuit 141 and a counter 142 which are similar to the edge detecting circuit 105 and the counter 101 and is arranged to coincide with an intermediate output value DC of the counter 142 between its output values DA and DB. In other words, the S/H circuit 140 is allowed to operate at the rise of the output of a comparator 143.

The digital VTR of this embodiment which is arranged as described above is capable of adequately performing tracking control as well as multi-track recording. The VTR does not necessitate the provision of any additional track nor any stationary head. With an erasing head arranged to be a rotary head, the digital VTR can be arranged to have only rotary heads without any stationary head, so that the load imposed by the travel of the tape can be greatly lessened.

Figure 7:
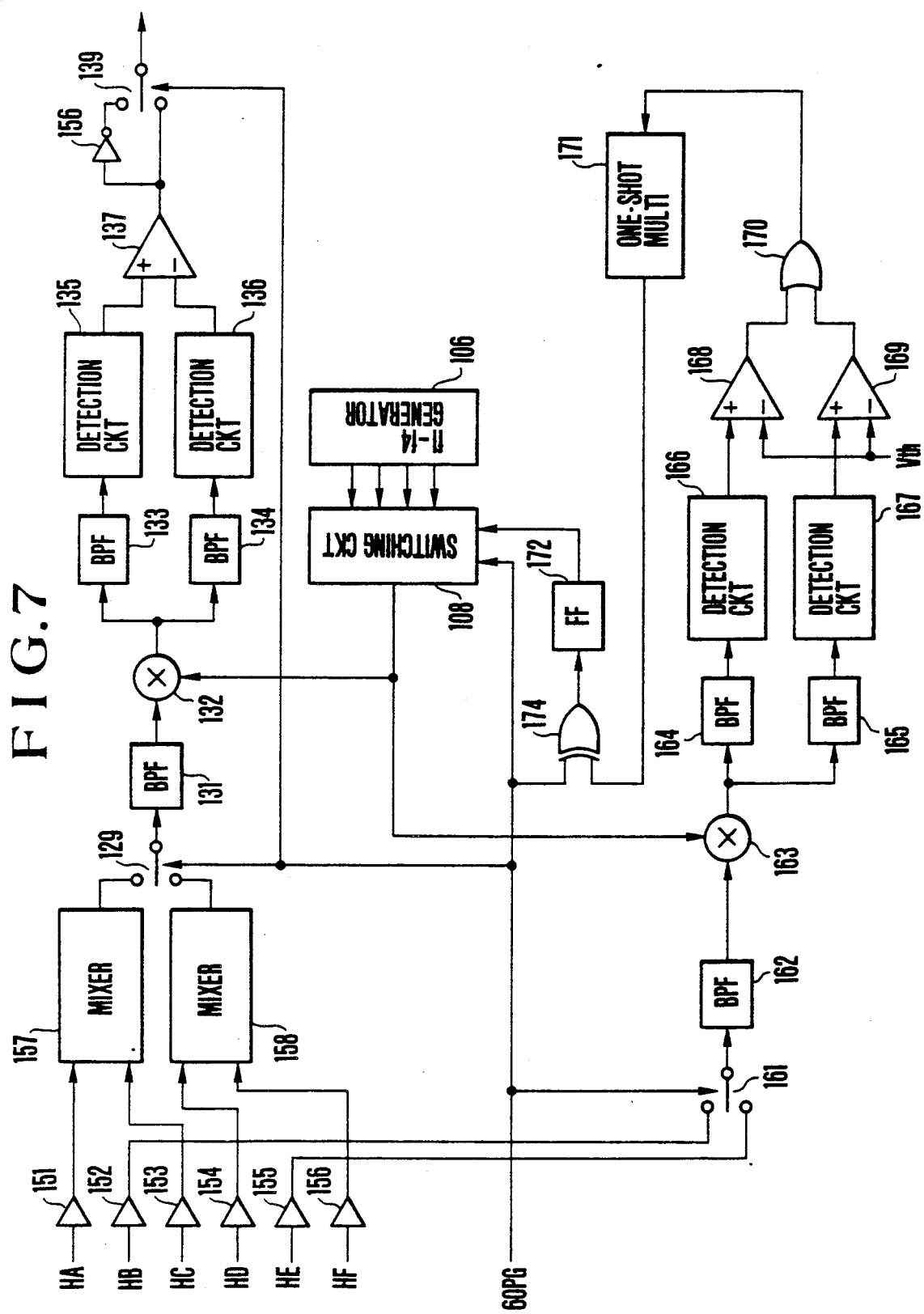
FIG. 7 is a diagram showing a modification of the arrangement shown in FIG. 6.

FIG. 7 shows an example of modification of the arrangement of FIG. 6. In FIG. 7, the same components as those shown in FIG. 6 are indicated by the same reference numerals. Signals reproduced by the heads HA to HF are amplified respectively by amplifiers 151 to 156. The signals reproduced by the heads HA and HC are then mixed by a mixer 157. The signals reproduced by the heads HD and HF are mixed by a mixer 158. In case that a tracking deviation takes place from the group of three tracks under control, the same tracking control as the control shown in FIG. 1 can be accomplished using only the signals reproduced from two tracks located on both sides of the group if the amount of the deviation is within one head width. Further, even if the amount of deviation exceeds one head width, tracking control can be likewise accomplished though the time of control may somewhat delay. Therefore, the output signal of the switch 139 can be sampled and held at the above stated timing to give the ATF signal.

Meanwhile, the reproduction outputs of the heads HB and HE are alternately produced from a switch 161 at every 1/60 sec. Then, the pilot signal components f1, f2, f3 and f4 are extracted by a BPF 162. The output signals of the BPF 162 are subjected to a multiplying operation with the reference signals f1, f2, f3 and f4 at a multiplier 163. The output of the multiplier 163 is supplied to BPFs 164 and 165. The BPFs 164 and 165 then extract frequency components fc and fd. The frequency component fc is set at $f4-f2$ and the other component fd at $f3-f1$ respectively. The presence of the component fc or fd in the output of the multiplier 163 indicates that each of the heads is deviating from the applicable track to an extent of four track pitches or thereabout. The embodiment is arranged to shift, in that event, the controlling track to an extent of six track pitches. The details of this arrangement.

The outputs of the BPFs 164 and 165 have their levels detected by detection circuit 166 and 167. Then, they are compared with a given threshold value Vth at comparators 168 and 169. If any of the comparators 168 and 169 produces a high level output, the output level of an OR gate 170 becomes high to trigger a one-shot multivibrator 171. The one-shot multivibrator 171 then supplies a pulse signal to an exclusive OR (EXOR) gate 174. If this EXOR gate 174 is not provided, a flip-flop (FF) 172 would function as a ½ frequency divider to give a rectangular wave signal of 30 Hz. However, with the pulse signal produced from the one-shot multivibrator 171, the FF 172 is triggered. As a result, the polarity of the rectangular wave signal of 30 Hz is inverted. As described in the foregoing with reference to FIG. 6, the switching circuit 108 is arranged to produce the reference frequency outputs f1, f2, f3 and f4 according to the combination of the logic levels of this rectangular wave signal of 30 Hz and the 60 PG signal. Therefore, with the polarity of the rectangular wave signal of 30 Hz from the FF 172 inverted, the rotation of the reference frequency signal outputs f1, f2, f3 and f4 of the switching circuit 108 is shifted by two.

With the reference signal producing rotation shifted as mentioned above, the track to be controlled is shifted to the extent of (2×3) tracks. As a result, there is obtained a transient state. If the head is deviating by more than four tracks, the above stated arrangement of this embodiment enables the head to be immediately brought into a state of deviating to an extent not more than two tracks. Therefore, a period of time required for pulling the control system into a tracking control state can be shortened to a great degree.

In the embodiment described, the pilot signals are arranged to be time-shared and multiplexed along with the video and audio signals. This arrangement may be changed to a frequency multiplexing arrangement. Further, in the embodiment described, the pilot signals are arranged to be recorded in all of the three adjacent tracks. However, the same tracking control can be accomplished by recording the pilot signals only in tracks located on two sides of the group of the three tracks instead of all tracks.

The tracking control is arranged to be performed by using the signals obtained by mixing the signals reproduced by the plurality of heads. However, this may be replaced with a different arrangement, wherein: For example, a component fB which is separated from a selected one of the reproduced signals of the heads HA and HF is compared with a component fA which is separated from a selected one of the reproduced signals of the heads HC and HD. This modification permits reduction in the length of pilot signal recording time by somewhat shifting the timing of the S/H action. Further, while the sequence of generating the reference signals f1, f2, f3 and f4 in rotation is arranged to be the same as the sequence of rotation in which the pilot signals are recorded, this arrangement may be changed to have the reference signals generated, for example, in the sequence of f1–f4–f3–f2 if the sequence employed in recording is f1–f2–f3–f4. That modification dispenses with the inverting amplifier 138 and the switch 139.

Figure 8:
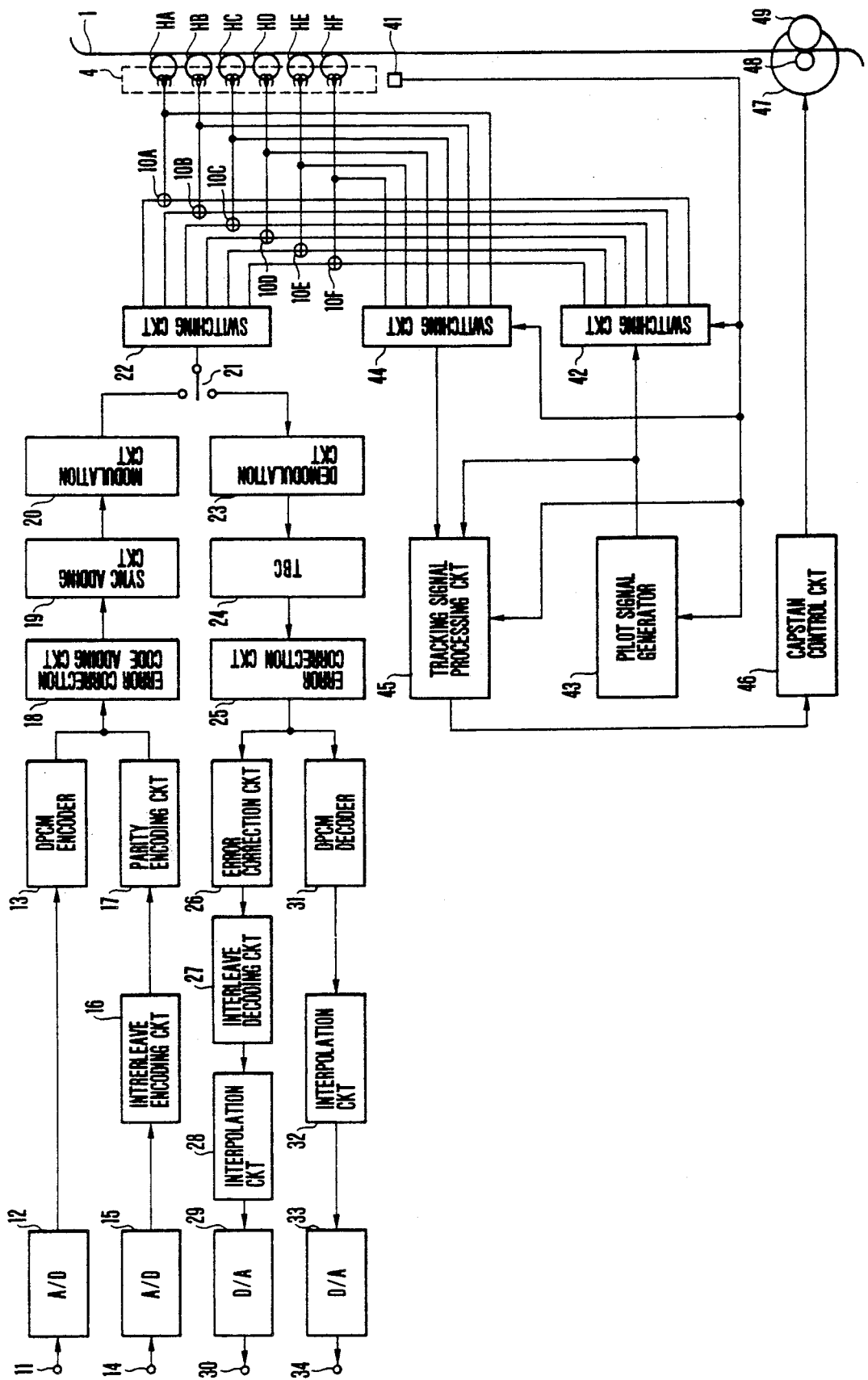
FIG. 8 is a diagram showing the arrangement of the embodiment of FIG. 3 as in a modified state in case where pilot signals are to be superimposed on clock-run-in signals.

Again referring to FIG. 4(c), the arrangement to frequency multiplex the pilot signal along with the clock-run-in e or b brings about no adverse effect on each other, because: the clock-run-in has narrow recording band while the pilot signal is arranged to be at a sufficiently low frequency. In the circuit arrangement, the value of the signals DA, DB and DC shown in FIG. 6 is arranged to coincide with the timing of the part ex of FIG. 4(c). Meanwhile, as shown in FIG. 8, the six outputs of the switching circuit 22 of FIG. 3 and the six outputs of another switching circuit 42 are added together by adders 10A, 10B, 10C, 10D, 10E and 10F and the outputs of these adders are supplied to the heads HA, HB, HC, HD, HE and HF.

The digital VTR arranged as described above is capable of performing adequate tracking control without any additional area for recording the pilot signals and without affecting the information data recorded.

Figure 9:
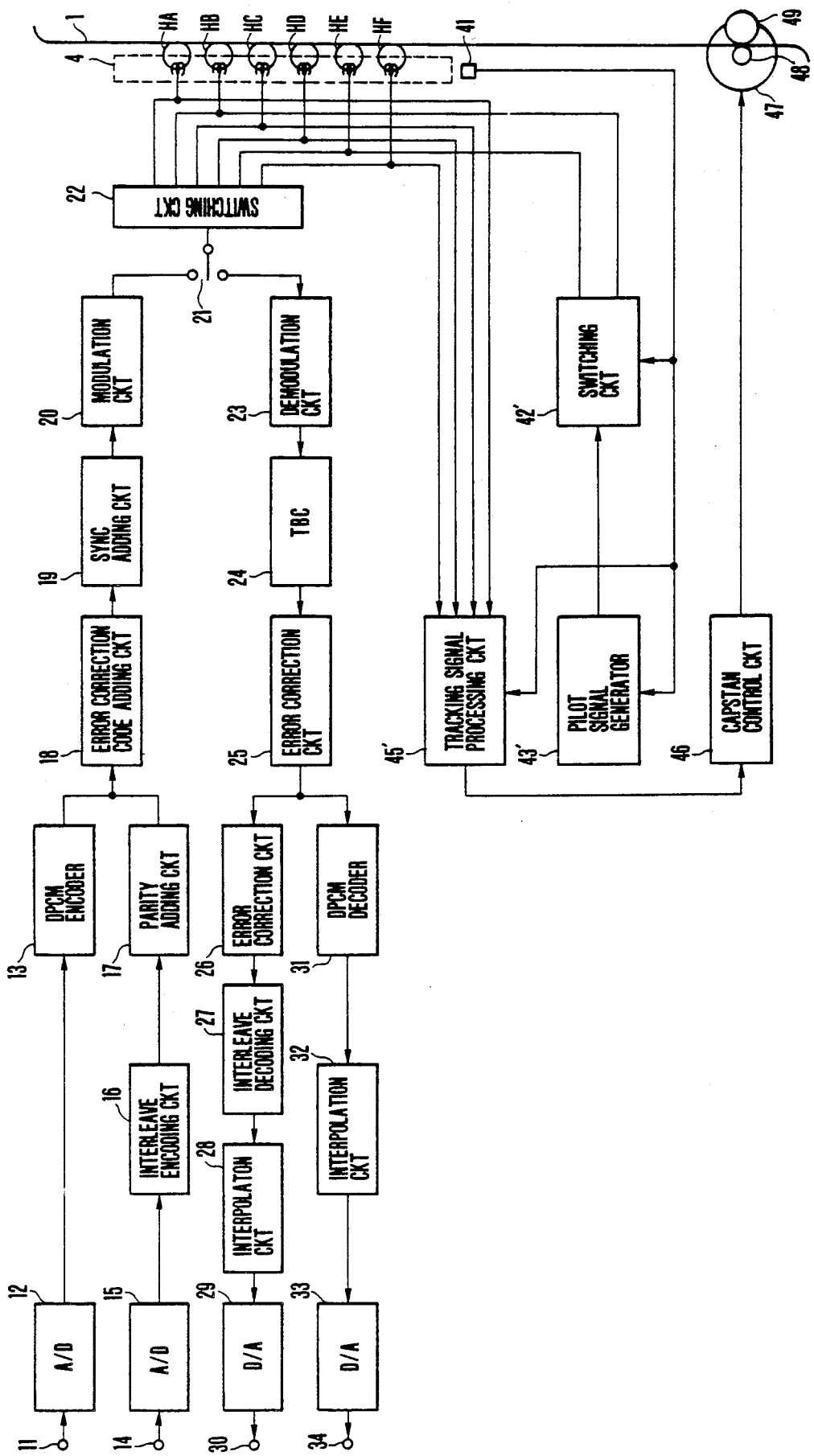
FIG. 9 is a diagram showing in outline the arrangement of a whole digital VTR according to this invention as another embodiment thereof.
Figure 10:
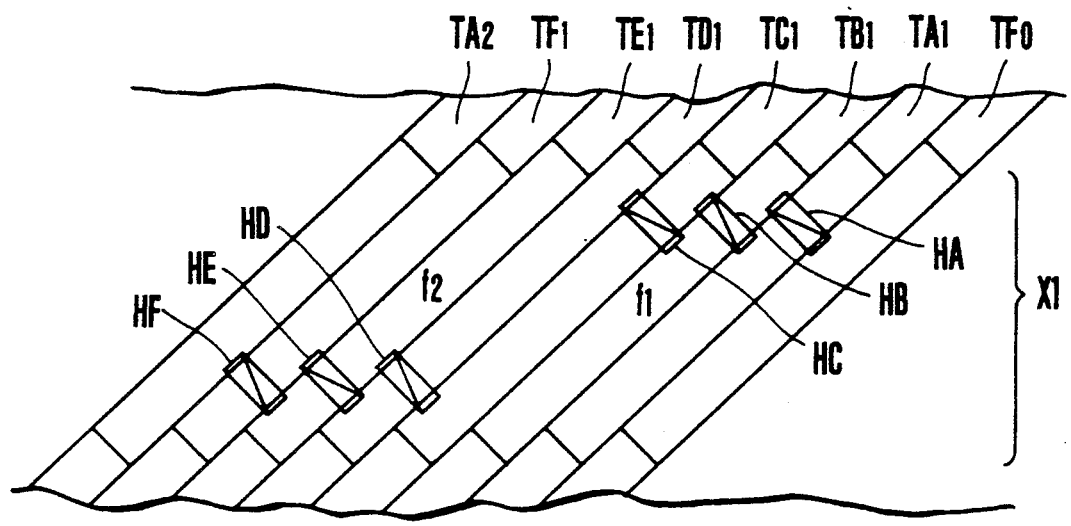
FIG. 10 is an illustration of the principle of tracking control to be performed by the embodiment shown in FIG. 9.

FIG. 9 shows in outline the whole of a digital VTR arranged according to this invention as another embodiment thereof. The components similar to those shown in FIG. 3 are indicated by the same reference numerals and the details of them are omitted from the following description: In the case of this VTR, one of two different pilot signals is recorded in a track located in the middle among a group of adjacent tracks. The recording position of the pilot signal is selected from among the different positions shown in FIGS. 4(b), 4(c) and 4(d). However, in the following description, the pilot signal is assumed to be recorded according to the recording pattern shown in FIG. 4(b). FIG. 10 shows the principle of the tracking control to be performed by the VTR of this embodiment. Referring to FIG. 10, the heads HA, HB, HC, HD, HE and HF are arranged to form tracks TA, TB, TC, TD, TE and TF respectively. The azimuth angle of the heads HA, HC and HE differs from that of other heads HB, HD and HF. The pilot signal shown in FIG. 4(b) is arranged to be recorded in an area X1. Assuming that the heads HA, HB and HC are accurately tracing the tracks TA1, TB1 and TC1 as shown in FIG. 10 (a just tracking state), signals reproduced by the heads HA and HC include the pilot signal component f1 at the same level. Then, if the head HB deviates to the right as viewed on the drawing, the reproducing level of the head HC becomes higher than that of the head HA. In this event, the travelling speed of the tape is lowered to bring the head HB into a just tracking position on the track TB1. If the heads HD, HE and HF are just tracking the tracks TD1, TE1 and TF1, signals reproduced by the heads HD and HF include the pilot signal component f2 at the same level. A shift of the position of the head HE to the right as viewed on the drawing then causes the reproducing level of the head HF to become higher than that of the head HD. In that event, the traveling speed of the tape is lowered to bring the head HE into a just track position on the track TE1.

Figure 11:
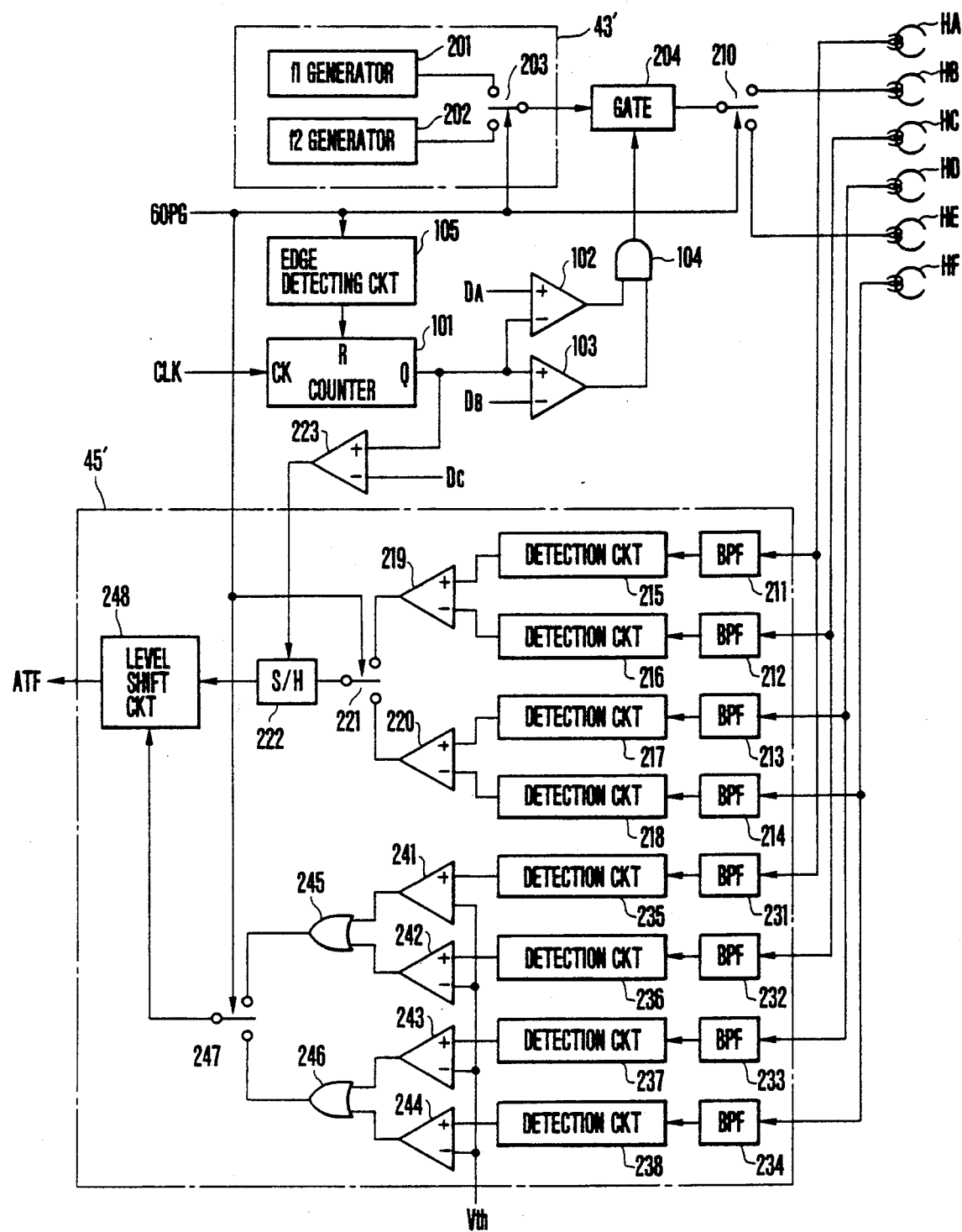
FIG. 11 is a diagram showing by way of example the arrangement of a tracking control system employed in the embodiment shown in FIG. 9.

FIG. 11 shows an example of arrangement of the tracking control system of the VTR which is capable of performing tracking control in the above stated manner. In FIG. 11, the components corresponding to those shown in FIGS. 6 and 9 are indicated by the same reference numerals. Frequency signal generators 201 and 202 are arranged to generate pilot signals f1 and f2. The generated signals f1 and f2 are supplied to a gate circuit 204 via a switch 203 the position of which is changed from one connecting position over to another at every 1/60 sec by the 60 PG signal. The gate circuit 204 is arranged to perform control in the same manner as in the case of FIG. 6. Therefore, the operation of it is omitted from the following description. The pilot signals f1 and f2 gated by the gate circuit 204 are supplied to the heads HB and HE respectively via a switch 210, the position of which is changed from on connecting position over to another at every 1/60 sec by the 60 PG signal. Then, the pilot signals f1 and f2 are recorded in the area X1 as shown in FIG. 10.

Band-pass filters (BPFs) 211 and 212 are arranged to separate a pilot signal component f1 from signals reproduced by the heads HA and HC. BPFs 213 and 214 are arranged to separate a pilot signal component f2 from signals reproduced by the heads HD and HF. The outputs of these BPFs 211, 212, 213 and 214 are supplied respectively to detection circuits 215, 216, 217 and 218 to have their levels detected there. The outputs of the detection circuits 215 and 216 are compared with each other at a comparator 219. The outputs of the detection circuits 217 and 218 are compared at a comparator 220.

A switch 221 is under the control of the 60 PG signal and is arranged to supply the output of the comparator 219 to a sample-and-hold (S/H) circuit 222 while the heads HA, HB and HC are tracing the surface of the tape 1 and to supply the output of the other comparator 220 to the S/H circuit 222 while other heads HD, HE and HF are tracing the tape.

The timing of the S/H action of the S/H circuit 222 is arranged to enable the heads HB and HE to reproduce pilot signals from tracks adjacent to the tracks TB and TE on both sides of them. More specifically, the S/H timing is arranged to be a point of time at which the output of a counter 101 comes to coincide with an intermediate value DC between signals DA and DB. In other words, the S/H circuit 222 comes to operate at a rise of the output of a comparator 223.

The S/H circuit 222 produces an ATF signal, which varies in proportion to the degree of a tracking error as long as the tracking error is within a one track pitch distance and does not vary in proportion to the degree of the tracking error if the error exceeds one track pitch. Further, the tracking control becomes impossible in the event of a tracking error exceeding a two track pitch distance. In the event of a tracking error exceeding the two track pitch distance, the pilot signal component f2 is included in the reproduction outputs of the heads HA and HC and the pilot signal component f1 in those of the heads HD and HF.

BPFs 231 and 232 are arranged to separate the component f2 included in the reproduction outputs of the heads HA and HC. BPFs 233 and 234 are arranged to separate the component f1 included in the reproduction outputs of the heads HD and HF. The output signals of the BPFs 231, 232, 233 and 234 are supplied to detection circuits 235, 236, 237 and 238 to have their levels detected there. The outputs of these detection circuits are supplied to comparators 241, 242, 243 and 244 to be compared with a given threshold value respectively.

Therefore, when any one of the outputs of these comparators 241, 242, 243 and 244 becomes a high level, it indicates an abnormality of the tracking control. In this event, the output of the S/H circuit 222 becomes nearly zero and the tracking error exceeds two track pitches. Therefore, if the output level of an OR gate 245 becomes high while the heads HA, HB and HC are tracing the tape or if that of another OR gate 246 becomes high while the heads HD, HE and HF are tracing the tape, the capstan is driven to force each of the heads to come to trace the tape within a tracking controllable range by actuating a level shift circuit 248 via a switch 247.

The output signal of the level shift circuit 248 is supplied to the capstan control circuit 46 as an ATF signal for tracking control.

In the embodiment described, the digital VTR has the following advantages in addition to the same advantages as those of the embodiment shown in FIG. 3: Use of pilot signals of only two kinds suffices for the tracking control. During reproduction, the ATF signal can be obtained by using the pilot signals as they are without any special process. Therefore, the circuit arrangement can be simplified.

Further, in the embodiment, the pilot signal f1 is recorded in the track TB and the pilot signal f2 in the track TE. However, the advantageous effect is likewise attainable also by a different arrangement, wherein: A pilot signal is recorded at least in one of a unit group of an n number of adjacent tracks excluding tracks located at both ends of the group of tracks. For example, tracking control can be also advantageously accomplished by recording each of the pilot signals of the same frequency always in a track located in the middle of the unit of three adjacent tracks with the above stated number n assumed to be three and, unlike the embodiment described, without any arrangement against an abnormality of the tracking control.

Figure 12:
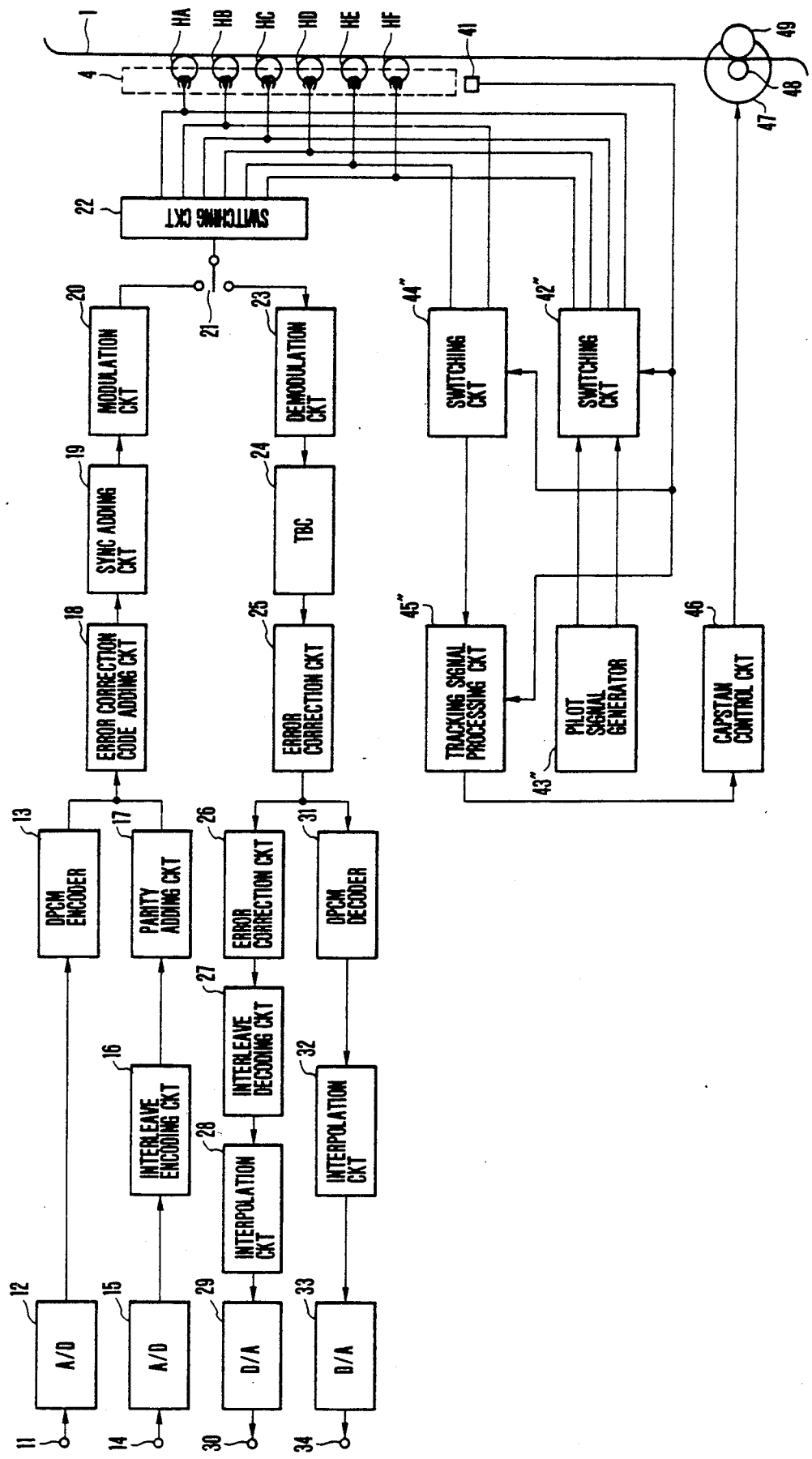
FIG. 12 is a diagram showing in outline the arrangement of a whole digital VTR arranged according to this invention as a further embodiment thereof.

FIG. 12 shows in outline a digital VTR arranged as a further embodiment of this invention. In FIG. 12, the components similar to those shown in FIG. 3 are indicated by the same reference numerals and the details of them are omitted from the following description. In the case of the VTR of this embodiment, pilot signals of two different kinds are separately recorded in tracks located on both sides of each unit of adjacent tracks. The pilot signal recording position in each of these tracks is the same as in the preceding embodiments.

Figure 13:
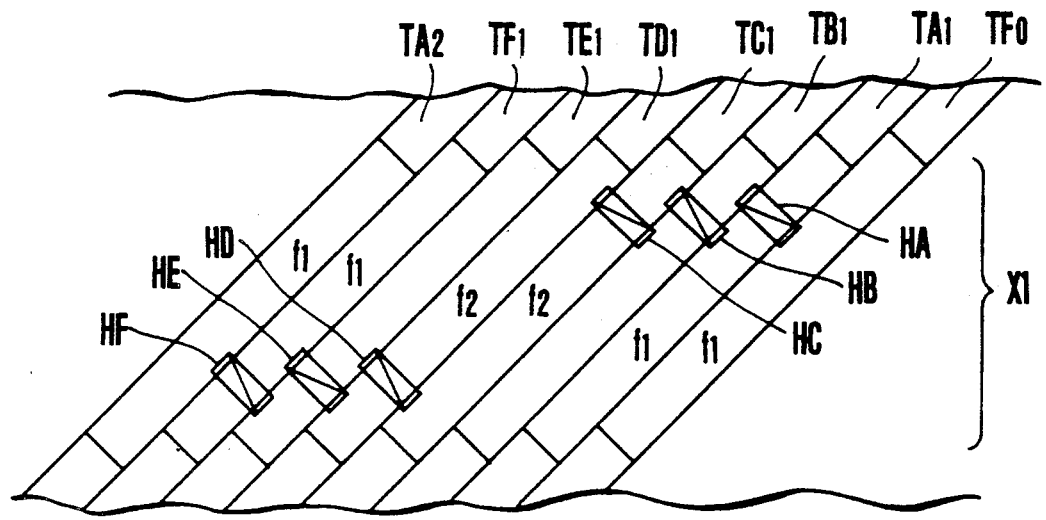
FIG. 13 is an illustration of the principle of tracking control to be performed by the embodiment shown in FIG. 12.

FIG. 13 shows the principle of tracking control to be performed by the VTR of this embodiment. Referring to FIG. 13, the heads HA, HB, HC, HD, HE and HF form tracks TA, TB, TC, TD, TE and TF respectively. The heads HA, HC and HE have a different azimuth angle from that of other heads HB, HD and HF. A reference symbol X1 denotes a recording area for the pilot signal shown in FIG. 4(b).

When the heads HA, HB and HC are accurately tracing tracks TA1, TB1 and TC1 (just tracking), pilot signal components f1 and f2 are included at the same level in a signal reproduced by the head HB. If the position of the head HB shifts to the right as viewed on the drawing, the reproduced level of the component f1 becomes higher than that of the component f2. In this event, the traveling speed of the tape is lowered to bring the head HB into a just tracking position on the track TB1. Meanwhile, when other heads HD, HE and HF are just tracking the tracks TD1, TE1 and TF1, pilot signal components f1 and f2 are included at the same level in a signal reproduced by the head HE. Should the head HE deviate to the right as viewed on the drawing, the reproduced level of the component f2 would become higher than that of the component f1. In that event, the traveling speed of the tape is also lowered to bring the head HE into a just tracking position on the track TE1.

Figure 14:
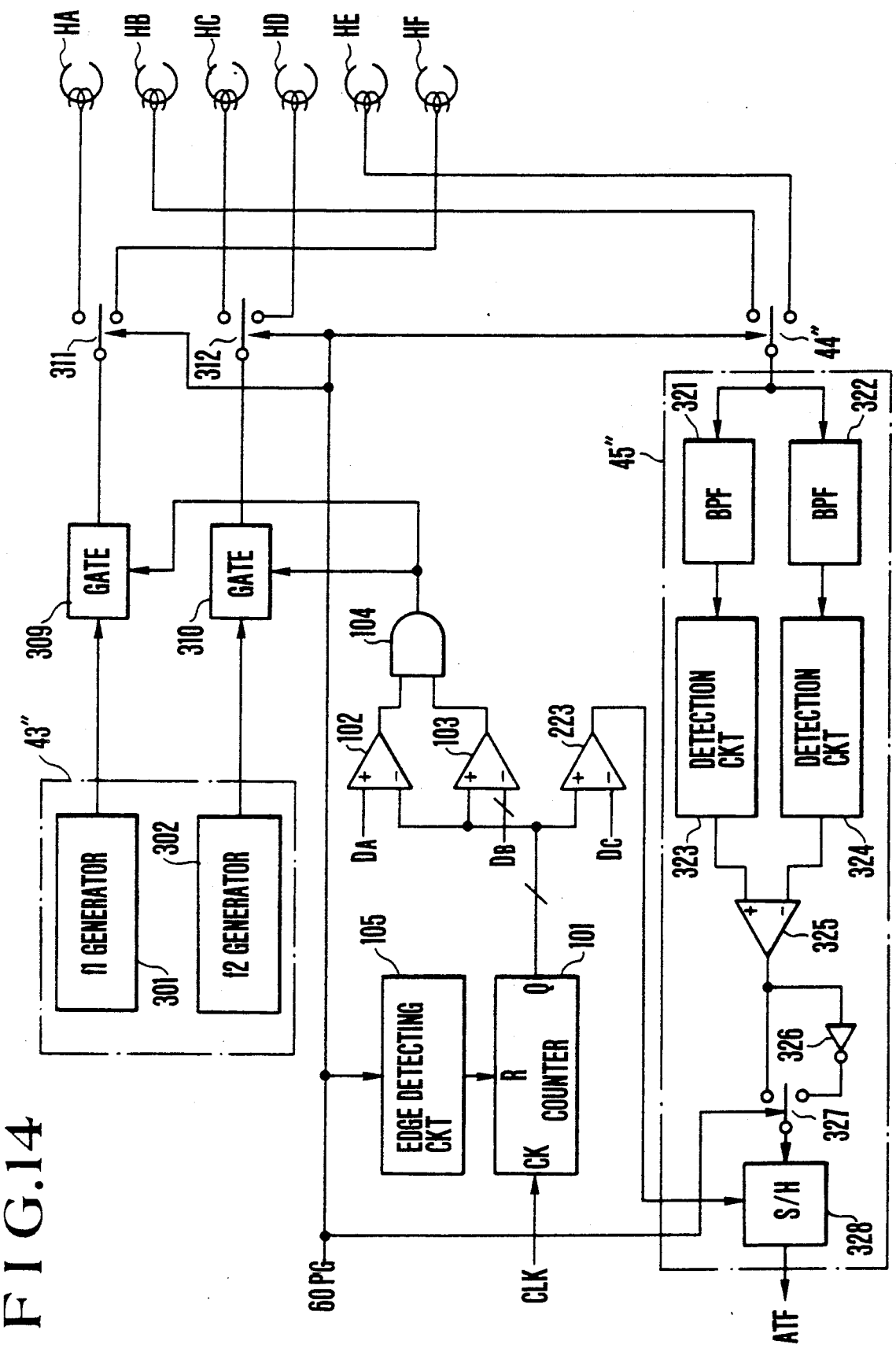
FIG. 14 is a diagram showing an example of arrangement of a tracking control system included in the embodiment shown in FIG. 12.

To accomplish the above stated tracking control, the embodiment includes a tracking control system which is arranged, for example, as shown in FIG. 14. In FIG. 14, the components of the system similar to those shown in FIGS. 6 and 12 are indicated by the same reference numerals. Generators 301 and 302 are arranged to generate the pilot signals f1 and f2. In the same manner as in the preceding embodiment, gates 309 and 310 are arranged to give the gate timing corresponding to the area X1 shown in FIG. 4(b). The pilot signals f1 and f2 which are thus gated by the gates 309 and 310 are supplied to switches 311 and 312. The connecting position of each of these switches is changed from one position over to another by the 60 PG signal. The switch 311 supplies the signal f1 to the heads HA and HF and the switch 312 the signal f1 to the heads HC and HD respectively. The pilot signals f1 and f2 is thus recorded in the area X1 as shown in FIG. 13.

The outputs of the heads HB and HE are supplied by a switch 44" alternately to a tracking signal processing circuit 45" at every 1/60 sec. Band-pass filters (BPFs) 321 and 322 are arranged to separate the pilot signals f1 and f2. The separated signals f1 and f2 have their levels detected by detection circuits 323 and 324 and, after that, are compared with each other at a comparator 325. As mentioned in the foregoing, the direction in which the component fA is obtained and the direction in which the component fB is obtained on the tape 1 are conversely inverted every time the controlled unit of three tracks changes from one unit over to another. The output of the comparator 325 coming directly and the output of the comparator coming via an inverting amplifier 326 to a switch 327 are alternately produced from the switch 327 being switched from one over to the other for every field. A sample-and-hold (S/H) circuit 328 is arranged to sample and hold the signal produced from the switch 327. The output of the S/H circuit 328 is supplied as an ATF signal to the capstan control circuit 46 mentioned in the foregoing to be used for tracking control. The sample-and-holding timing is arranged, in the same manner as in the case of FIG. 11, to enable the heads HB and HE to reproduce pilot signals from both the tracks adjacent to the tracks TB and TE according to the output of the comparator 223.

The VTR of this embodiment is also capable of performing adequate tracking control despite of a simple circuit arrangement in the same manner as the preceding embodiments described in the foregoing.

In the embodiment described, the VTR is arranged to record the pilot signal f1 in the tracks TA and TF and the pilot signal f2 to the tracks TC and TD. Generally, in an apparatus having an n number of recording heads for forming an n number of adjacent tracks, tracking control can be accomplished by recording pilot signals of two different kinds for every unit of the n number of tracks with one pilot signal recorded at least in one of the n number of tracks. For example, in the case of this embodiment in which the number n is 3, tracking control can be accomplished by recording the signal f1 in the track TA and the signal f2 in the track TD and, in reproduction, by comparing the levels of the signals f1 and f2 reproduced by the heads HB, HC, HE and HF. It is also possible to arrange the VTR to have the signal f1 in the track TA and the signal f2 in the track TC; to compare the levels of the signals f1 and f2 reproduced by the head HB; and to perform the sample-and-holding action at every 1/30 sec.

What is claimed is:

1. An information signal recording apparatus, comprising:
    a) head means including an m number ($m \geq 3$) of heads arranged to trace a recording medium while forming m number of adjacent tracks in parallel on said recording medium;
    b) first supply means for supplying said m number of heads with information signals of an m number of channels, said first supply means being arranged to have said information signals of the m number of channels recorded in said m number of adjacent tracks;
    c) second supply means for supplying at least one of said m number of heads with a pilot signal, said second supply means being arranged to have said pilot signal recorded in at least one of said m number of adjacent tracks except those located on both sides of the m number of adjacent tracks; and
    d) timing control means for controlling a timing that said first supply means supplies said information signals and a timing that said second supply means supplies said pilot signal so that one of said information signals of the m number of channels and said pilot signal are time shared with each other in one of the m number of tracks.

2. An apparatus according to claim 1, wherein said first supply means includes means for dividing an information signal of one channel into information signals of the m number of channels and for producing said information signals.

3. An apparatus according to claim 1, wherein said m number of heads are rotary heads and form many tracks in parallel by m tracks.

4. An apparatus according to claim 3, wherein said pilot signal includes one of n kinds ($n \geq 2$) of frequency signals, and said second supply means is arranged to periodically supply said n kinds of frequency signals in a period for forming ($n \times m$) number of tracks by said head means.

5. An information signal recording and reproducing apparatus comprising:
    a) recording head means including an m number ($m \geq 3$) of heads arranged to trace a recording medium while forming an m number of adjacent tracks in parallel on said recording medium;
    b) first supply means for supplying said m number of heads with information signals of an m number of channels, said first supply means being arranged to have said information signals of the m number of channels recorded in said m number of adjacent tracks;
    c) second supply means for supplying at least one of said m number of recording heads with a pilot signal, said second supply means being arranged to have said pilot signal recorded in at least one of an m number of adjacent tracks except those located on both sides of the m number of adjacent tracks;
    d) reproducing head means including said m number of heads; and
    e) control means for controlling positions of the m number of heads relative to said recording medium by using pilot signals reproduced by a pair of heads of the m number of heads which are arranged to mainly trace a pair of tracks on which none of said pilot signal is recorded.

6. An apparatus according to claim 5, wherein said control means includes comparison means for comparing levels of said pilot signals reproduced by the pair of heads.

7. An apparatus according to claim 5, wherein the pair of tracks are located on both sides of the m number of adjacent tracks.

8. An information signal reproducing apparatus for reproducing the information signal from a recording medium on which an m number ($m \geq 3$) of adjacent recording tracks are formed in parallel and pilot signals are recorded in at least one of said m number of adjacent recording tracks except those located on both sides of the m number of adjacent tracks, comprising:
    a) reproducing head means including an m number of heads arranged to trace the m number of adjacent tracks;
    b) comparison means for comparing levels of said pilot signals reproduced by a pair of heads of the m number of heads, the pair of heads being arranged to mainly trace a pair of tracks on which none of said pilot signals are recorded; and c) control means for controlling positions of the m number of heads relative to said recording medium in response to an output of said comparison means.

9. An information signal recording apparatus, comprising:
   a) head means including an m number (m≥3) of heads arranged to trace a recording medium while forming m number of adjacent tracks in parallel on said recording medium;
   b) first supply means for supplying said m number of heads with information signals of an m number of channels, said first supply means being arranged to have said information signals of the m number of channels recorded in said m number of adjacent tracks;
   c) second supply means for supplying at least two of said m number of heads with pilot signals, said second supply means being arranged to have said pilot signals recorded in a pair of tracks located adjacent both sides of said m number of adjacent tracks but not in one of the m number of adjacent tracks; and
   d) timing control means for controlling a timing that said first supply means supplies said information signals and a timing that said second supply means supplies said pilot signals, so that each of two of said information signals of the m number of channels and each of said pilot signals are time shared with each other in the pair of tracks.

10. An apparatus according to claim 9, wherein said first supply means includes means for dividing an information signals of one channel into said information signals of the m number of channels and for producing said information signals of the m number of channels.

11. An apparatus according to claim 9, wherein said m number of heads are rotary heads.

12. An apparatus according to claim 9, wherein said pilot signals includes first and second pilot signals, said second supply means is arranged to have said first pilot signal recorded in a track located on one side of said m number of adjacent tracks and to have said second pilot signal recorded in a track located on the other side of said m number of adjacent tracks.

13. An information signal recording and reproducing apparatus, comprising:
   a) recording head means including an m number (m≥3) of heads arranged to trace a recording medium while forming an m number of adjacent tracks in parallel on said recording medium;
   b) first supply means for supplying said m number of heads with information signals of an m number of channels, said first supply means being arranged to have said information signals of the m number of channels recorded in said m number of adjacent tracks;
   c) second supply means for supplying at least two of said m number of recording heads with pilot signals, said second supply means being arranged to have said pilot signals recorded in a pair of tracks located adjacent both sides of an m number of adjacent tracks but not in one of the m number of adjacent tracks;
   d) reproducing head means including said m number of heads; and
   e) control means for controlling positions of the m number of heads relative to said recording medium by using pilot signals reproduced by one of the m number of heads which is arranged to mainly trace the one of the m number of adjacent tracks on which none of said pilot signals are recorded.

14. An apparatus according to claim 13, wherein said control means includes comparison means for comparing levels of said pilot signals reproduced from both sides of said m number of adjacent tracks.

15. An information signals reproducing apparatus for reproducing the information signal from a recording medium on which an m number (m≥3) of adjacent recording tracks are formed in parallel and pilot signals are recorded in a pair of tracks located on both sides of said m number of adjacent recording tracks but not in one of the m number of adjacent tracks, comprising:
   a) reproducing head means including an m number of heads arranged to trace the m number of adjacent tracks;
   b) comparison means for comparing levels of said pilot signals reproduced by one of said m number of heads which is arranged to mainly trace the one of the m number of adjacent tracks on which none of said pilot signals are recorded; and
   c) control means for controlling positions of the m number of heads relative to said recording medium in response to an output of said comparison means.

* * * * *

UNITED STATES PATENT AND TRADEMARK OFFICE
CERTIFICATE OF CORRECTION

PATENT NO. : 5,124,853   Page 1 of 2
DATED : June 23, 1992
INVENTOR(S) : Motokazu Kashida, et al It is certified that error appears in the above-indentified patent and that said Letters Patent is hereby corrected as shown below:

Col. 2, line 57.   Change "signals" to -- signal --
Col. 3, line 24.   Change "case" to -- cases --
Col. 4, lines 5, 9 & 21.   Change "$\phi$" to -- $f$ --
Col. 4, line 22.   Change "$\phi\delta$" to -- $f\Delta$ --
Col. 4, line 26.   Change "3$\phi$" to -- 3$f$ --
Col. 4, line 33.   After "difference" insert -- a --
Col. 4, lines 33 & 34.   Change "$\phi$" to -- $f$ --
Col. 4, line 40   Change "portions" to -- portion --
Col. 4, line 54.   Change "differential" to -- differentially --

UNITED STATES PATENT AND TRADEMARK OFFICE
CERTIFICATE OF CORRECTION

PATENT NO. : 5,124,853
DATED : June 23, 1992
INVENTOR(S) : Motokazu Kashida, et al It is certified that error appears in the above-indentified patent and that said Letters Patent is hereby corrected as shown below:

Col. 5, lines 6 & 7.  Delete spaces; continue as one sentence
Col. 6, line 20.  Change "i.e." to -- i.e., --
Col. 7, line 1.  Change "Comparators" to -- comparators --
Col. 8, line 59.  After "arrangement" insert -- : --
Col. 9, line 58.  After "has" insert -- a --
Col. 12, line 68.  After "312" insert -- , --
Col. 13, line 1.  Change "is" to -- are --
Col. 13, line 30.  Delete "of"

Signed and Sealed this

Seventh Day of December, 1993

Attest:

Attesting Officer

BRUCE LEHMAN

Commissioner of Patents and Trademarks